United States Patent
Hietala et al.

(10) Patent No.: US 9,519,612 B2
(45) Date of Patent: Dec. 13, 2016

(54) SERIAL BUS BUFFER WITH NOISE REDUCTION

(71) Applicant: RF Micro Devices, Inc., Greensboro, NC (US)

(72) Inventors: Alexander Wayne Hietala, Phoenix, AZ (US); Christopher Truong Ngo, Queen Creek, AZ (US); Eric K. Bolton, Kernersville, NC (US)

(73) Assignee: Qorvo US, Inc., Greensboro, NC (US)

( * ) Notice: Subject to any disclaimer, the term of this patent is extended or adjusted under 35 U.S.C. 154(b) by 397 days.

(21) Appl. No.: 14/160,900

(22) Filed: Jan. 22, 2014

(65) Prior Publication Data

US 2014/0304442 A1 Oct. 9, 2014

Related U.S. Application Data

(60) Provisional application No. 61/808,357, filed on Apr. 4, 2013.

(51) Int. Cl.
*G06F 13/24* (2006.01)
*G06F 13/42* (2006.01)

(52) U.S. Cl.
CPC ................................ *G06F 13/4291* (2013.01)

(58) Field of Classification Search
None
See application file for complete search history.

(56) References Cited

U.S. PATENT DOCUMENTS

| | | | | |
|---|---|---|---|---|
| 7,574,730 B1* | 8/2009 | Masuda | ............. | H04L 12/6418 379/338 |
| 2004/0239520 A1* | 12/2004 | Seo | ..................... | H02J 13/0044 340/12.31 |
| 2006/0022856 A1* | 2/2006 | Choe | ................... | H03M 1/0881 341/144 |
| 2006/0242348 A1* | 10/2006 | Humphrey | .......... | G06F 13/4291 710/305 |
| 2011/0135078 A1* | 6/2011 | Soo | ....................... | H04M 3/568 379/202.01 |
| 2013/0279237 A1* | 10/2013 | Huang | ................. | G11C 13/004 365/148 |

OTHER PUBLICATIONS

Nomachi, Masaharu et al., "A Data Readout System with High-Speed Serial Data Link for Balloonborne X-Ray Detectors," 2004 IEEE Nuclear Science Symposium Conference Record, vol. 3, Oct. 16-22, 2004, pp. 1478-1482.

\* cited by examiner

*Primary Examiner* — Elias Mamo
(74) *Attorney, Agent, or Firm* — Withrow & Terranova, P.L.L.C.

(57) ABSTRACT

Disclosed is a digital communication control system having a serial bus buffer that includes a primary interface adapted to support serial communication over a primary bus, a buffered interface adapted to support serial communication over a buffered bus, and a controller coupled between the primary bus and the buffered bus. The primary bus is coupled to a first device and at least one second device and the buffered bus is coupled to at least one third device. The controller is adapted to receive a first data signal and a clock signal at the primary interface and replicate the first data signal and the clock signal at the buffered interface.

23 Claims, 11 Drawing Sheets

US 9,519,612 B2

SERIAL BUS BUFFER WITH NOISE REDUCTION

RELATED APPLICATIONS

This application claims the benefit of U.S. provisional patent application No. 61/808,357, filed Apr. 4, 2013, the disclosure of which is hereby incorporated herein by reference in its entirety.

FIELD OF THE DISCLOSURE

The present disclosure relates to noise reduction for radio frequency front end (RFFE) architectures.

BACKGROUND

As shown in a related art schematic of FIG. 1, a typical wireless device 10 such as a cellular telephone includes a digital communication and control system 12 having physical wires or printed circuit board traces (not shown) to facilitate serial communication in a primary bus 14 that is used to convey clock signals, data signals, and other digital signals between a master device 16 and slave devices 18-1 through 18-N. In this exemplary embodiment, the primary bus 14 includes a serial clock (SCLK) line 20 that passes a clock signal to the slave devices 18-1 through 18-N, and a serial data (SDATA) line 22 that passes serial data to and from the slave devices 18-1 through 18-N. The slave devices 18-1 through 18-N may be associated with a sensitive region 24 of the wireless device 10 that is sensitive to spurious signals coupled to the primary bus 14 through operation of the master device 16. For example, harmonics associated with digital pulses used to implement a serial communication protocol can undesirably couple to antennas 26-1 through 26-N within the sensitive region 24.

FIG. 2 is a related art block diagram of the digital communication and control system 12 depicting the primary bus 14 communicatively coupling the master device 16 to the slave device 18-1, along with an LC filter 28 for filtering noise from the SCLK line 20 and an RC filter 30 for filtering noise from the SDATA line 24. In particular, the LC filter 28 and the RC filter 30 each filter out relatively high frequency noise coupled onto the primary bus 14. A disadvantage of the digital communication and control system 12 of FIG. 2 is a relatively high cost due to relatively large component values needed for components L1, C1, R1, and C2 making up the LC filter 28 and the RC filter 30, respectively. Another disadvantage of the digital communication and control system 12 is an occupation of relatively valuable circuit board area by the LC filter 28 and the RC filter 30. Yet another disadvantage is that the master device 16 typically requires a greater than desirable drive capability to drive the primary bus 14 as a result of an increase in capacitance presented by high frequency filters such as those represented by the LC filter 28 and the RC filter 30.

Thus, a new digital communication and control system is needed that reduces spurious signals coupled from the master device 16 to the slave devices 18-1 through 18-N that are controlled via the primary bus 14. There is a further need to minimize exposure of regions such as sensitive region 24 of the wireless device 10 to spurious signals without utilizing expensive filter components, which sacrifice valuable circuit board space and may significantly degrade the overall energy efficiency of the wireless device 10 (FIG. 1).

SUMMARY

A digital communication and control system having a serial bus buffer includes a primary interface adapted to support serial communication over a primary bus, a buffered interface adapted to support serial communication over a buffered bus, and a controller coupled between the primary bus and the buffered bus. The primary bus is coupled to a first device and at least one second device and the buffered bus is coupled to at least one third device. The controller is adapted to receive a first data signal and a clock signal at the primary interface and replicate the first data signal and the clock signal at the buffered interface.

According to some embodiments, the controller is further adapted to replicate the first data signal and the clock signal at the buffered interface at a desired drive level selected from a number of available drive levels.

According to some embodiments, the controller is further adapted to receive a second data signal at the buffered interface and replicate the second data signal at the primary interface.

According to some embodiments, the controller is further adapted to selectively replicate the first data signal and the clock signal at the buffered interface by selecting a desired buffered bus state from a number of available buffered bus states.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 9:
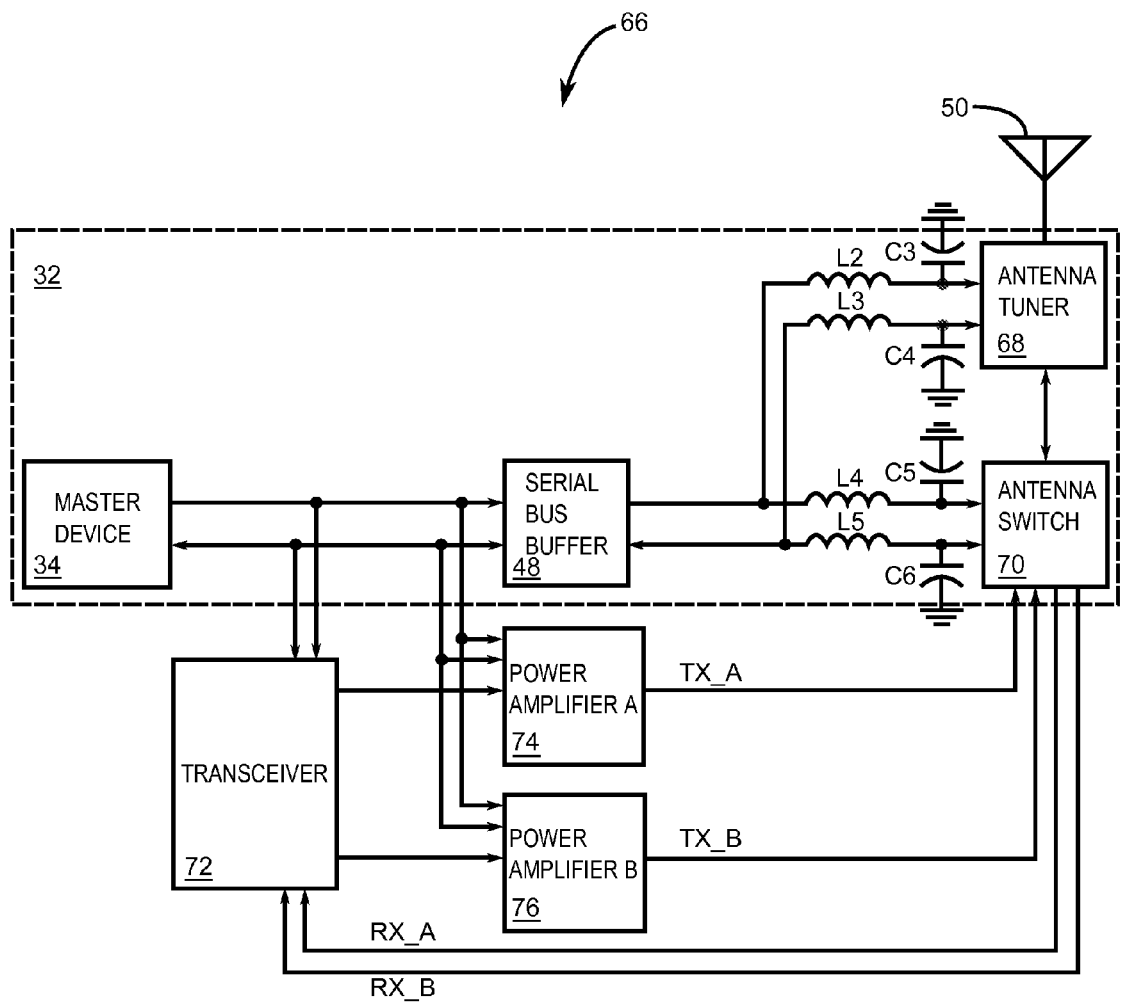

FIG. 9 is an RFFE digital communication and control system depicting a buffered bus structure that includes a number of LC filters, wherein each LC filter includes an LC filter inductor and an LC filter capacitor, a master device, sensitive slave devices, non-sensitive slave devices, a primary bus structure, and a serial bus buffer coupled between the primary bus and the buffered bus, as employed in at least one embodiment of the present disclosure.

Figure 10:
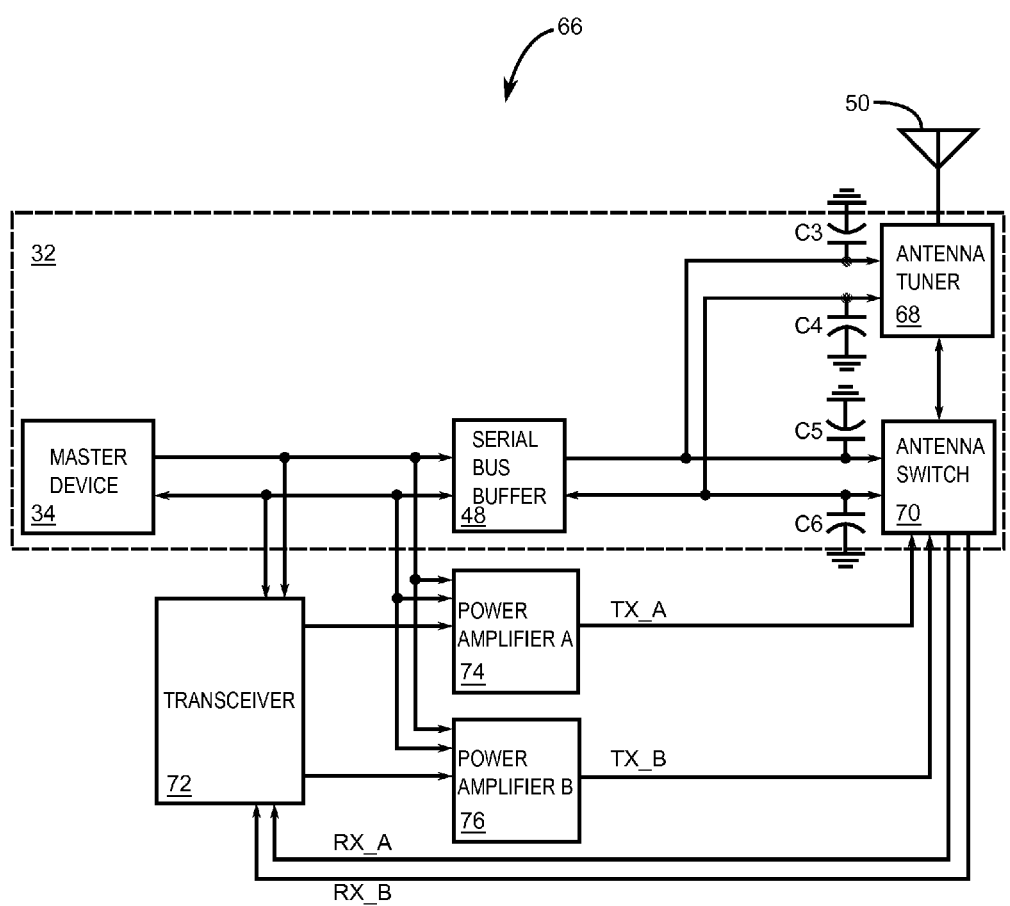

FIG. 10 is an RFFE digital communication and control system depicting, a master device, sensitive slave devices, non-sensitive slave devices, a primary bus structure, and a buffered bus structure, wherein the buffered bus structure includes a buffered data line with a shunt capacitor and a buffered clock line with a shunt capacitor, and a serial bus buffer coupled between the primary bus and the buffered bus, as employed in at least one embodiment of the present disclosure.

Figure 11:
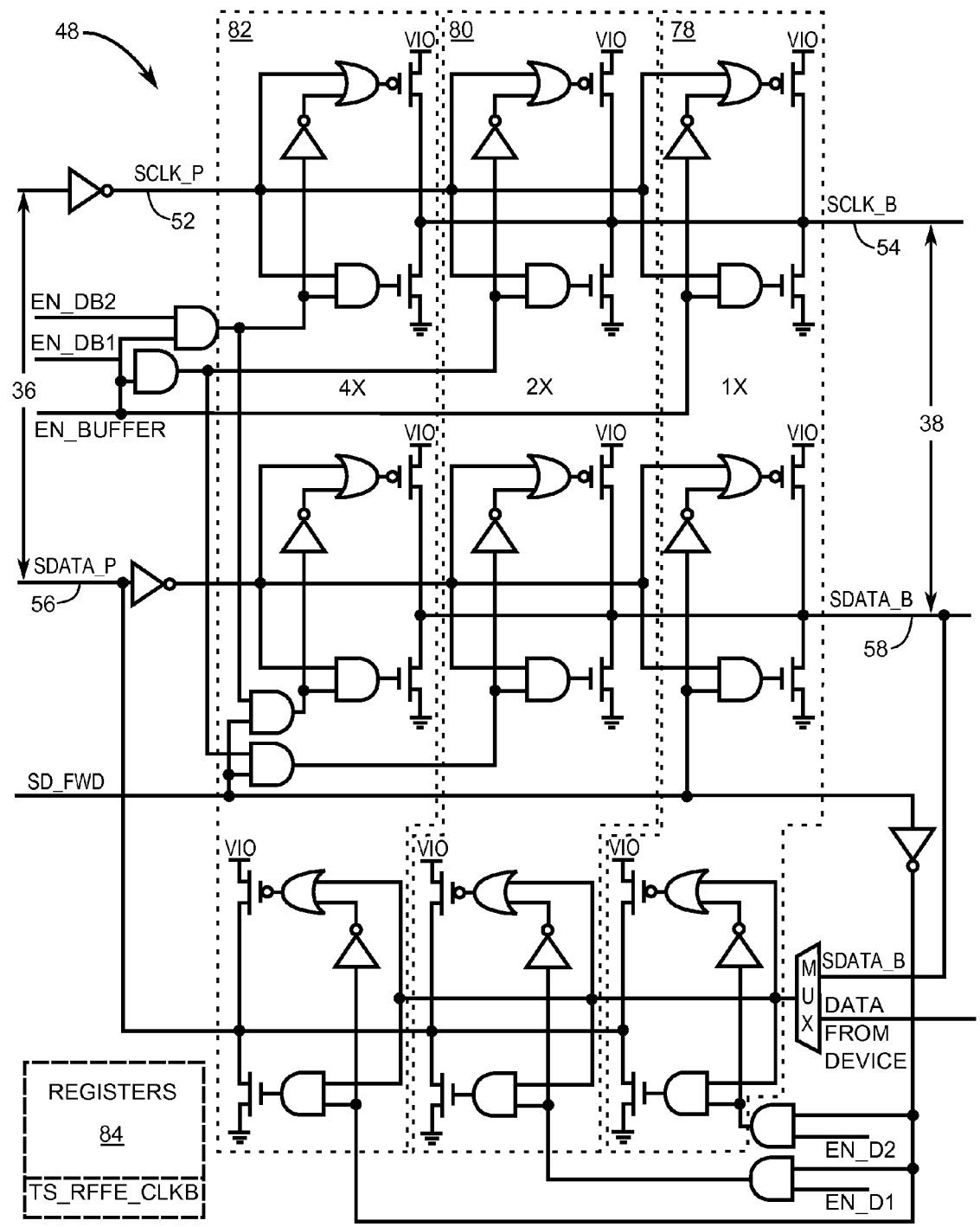

FIG. 11 is a schematic diagram of an exemplary serial bus buffer depicting a primary data line, a primary clock line, a buffered data line, a buffered clock line, an internal control line; a number of primary drive level bit lines, a number of buffered drive level bit lines, and at least one tri-state control line as employed in at least one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Figure 3:
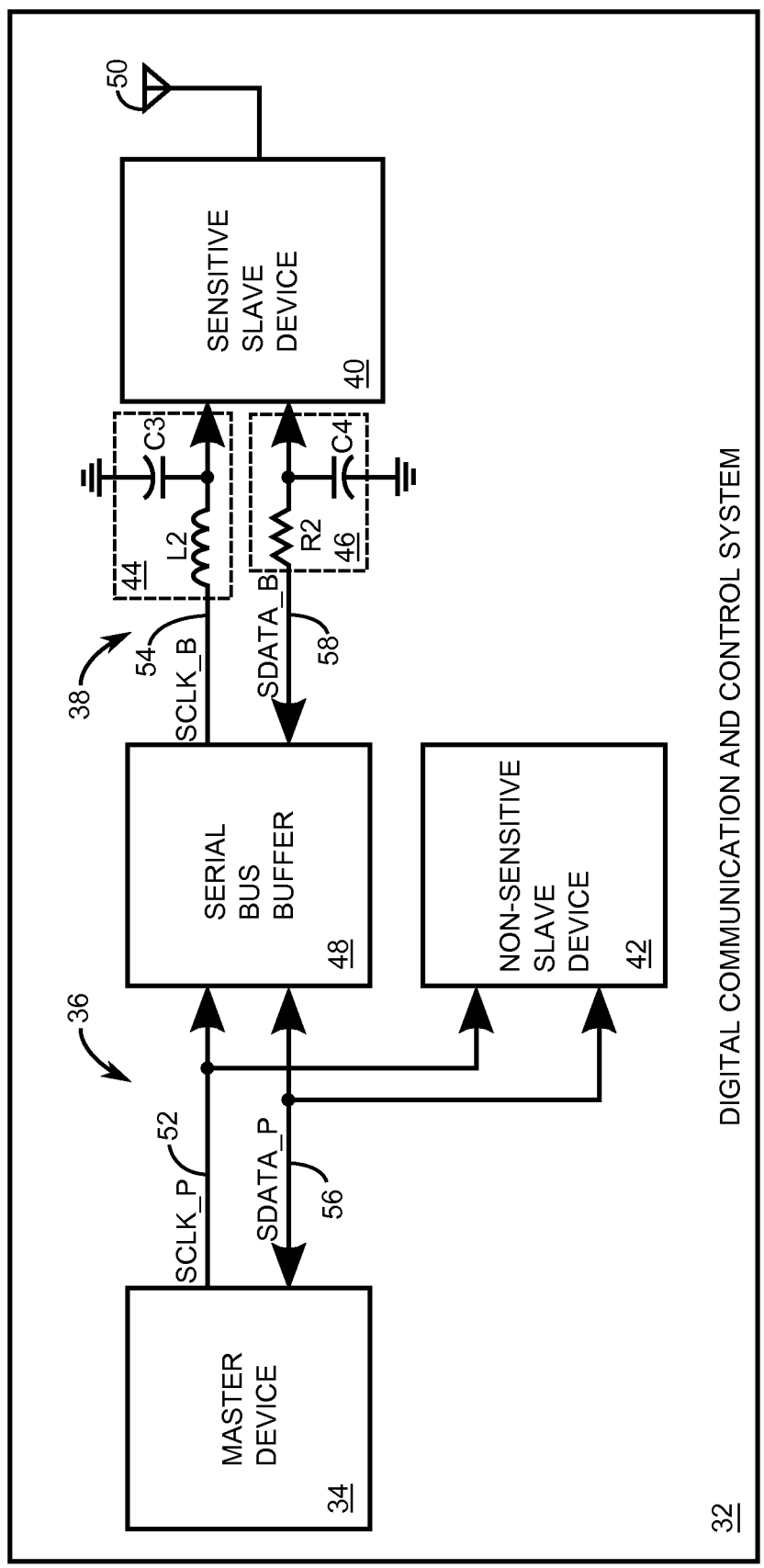
FIG. 3 is a block diagram of a digital communication and control system depicting a master device, a primary bus structure, a buffered bus structure, sensitive and non-sensitive slave devices, an LC filter, an RC filter, and a serial bus buffer as employed in at least one embodiment of the present disclosure.

FIG. 3 is a block diagram of an exemplary digital communication and control system 32 for a radio frequency front end (RFFE). The digital communication and control system 32 includes a master device 34, a primary bus 36, a buffered bus 38, a sensitive slave device 40 and a non-sensitive slave device 42, an LC filter 44, an RC filter 46, and a serial bus buffer 48 as employed in at least one embodiment of the present disclosure. In this exemplary case, the sensitive slave device 40 is coupled to an antenna 50. However, it is to be understood that the digital communication and control system 32 can include additional sensitive devices that may or may not be associated with additional antennas used for transmitting and receiving. In such a case, a drive current specification for the serial bus buffer 48 would be increased to drive additional filter components such that a minimum delay for signal transitions is achieved. Moreover, it is to be understood that the digital communication and control system 32 can include additional non-sensitive slave devices.

Rather than increasing the drive level of the master device 34, a repeater or buffer may be used to provide increased drive level to the regions of the device in which additional filtering is desired as shown in FIG. 3 and represented by the serial bus buffer 48. Regions that are not sensitive to spurious signals coupled on the primary bus 14 do not need additional filtering. Thus, devices within non-sensitive regions can typically be driven by the master device 34 alone. In contrast, devices that are within regions of the RFFE digital communication and control system 32 that are sensitive to noise coupled on the primary bus 36 are driven by the serial bus buffer 48 which provides a relatively greater drive level to appropriately drive the LC filter 44 and RC filter 46 coupled to the buffered bus 38. Thus, a minimum delay for signal transitions is achieved for sensitive devices having passive filtering. Moreover, the drive level of the master device 34 cannot be arbitrarily increased because the present MIPI RFFE standard has strict requirements on rise/fall times with a given maximum and minimum capacitive load. Thus, indirectly, the current source/sink capability is specified. The serial bus buffer 48 can drive more current than the present MIPI RFFE standard specifies because relatively much more capacitance than is typical is provided by the LC filter 44 and the RC filter 46. The fact that the serial bus buffer 48 has programmable drive levels allows many different capacitive loads to be supported within the MIPI RFFE standard specifications for rise/fall time.

The primary bus 36 includes a primary serial clock (SCLK_P) line 52 that passes a clock signal to the non-sensitive slave device 42 and the serial bus buffer 48. In turn, the buffered bus 38 passes a buffered copy of the clock signal over a buffered serial clock (SCLK_B) line 54 to the sensitive slave device 40. The primary bus 36 also includes a primary serial data (SDATA_P) line 56 that passes serial data to and from the non-sensitive slave device 42 as well as to and from the serial bus buffer 48. The buffered bus 38 also includes a buffered serial data (SDATA_B) line 58 that conveys a buffered copy of a data signal between the serial bus buffer 48 and the sensitive slave device 40.

Figure 4:
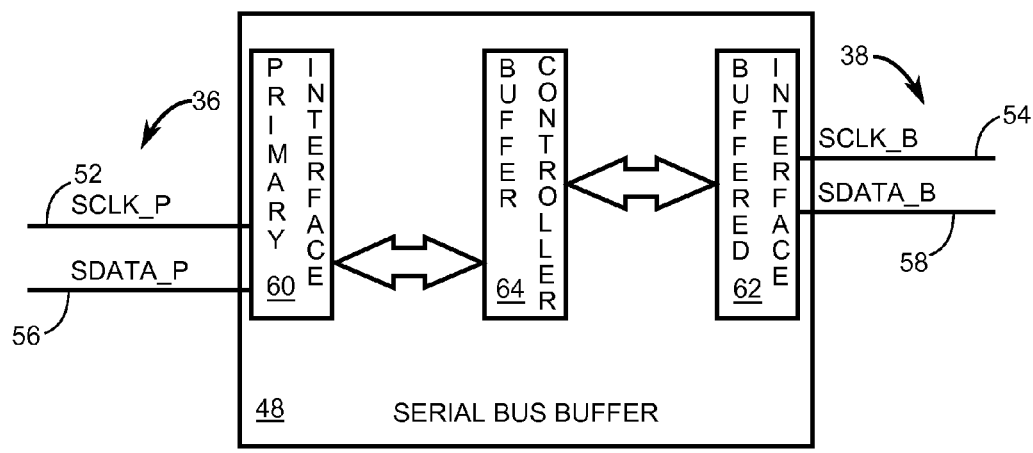
FIG. 4 is a block diagram of a serial bus buffer depicting a primary bus structure, a buffered bus structure, a primary interface, a buffered interface, and a buffer controller communicatively coupled between the primary interface and the buffered interface as employed in at least one embodiment of the present disclosure.

FIG. 4 is a block diagram of the serial bus buffer 48, which includes a primary interface 60, a buffered interface 62, and a buffer controller 64 communicatively coupled between the primary interface 60 and the buffered interface 62 as employed in at least one embodiment of the present disclosure. The serial bus buffer 48 is coupled between the primary bus 36 and the buffered bus 38.

Figure 5:
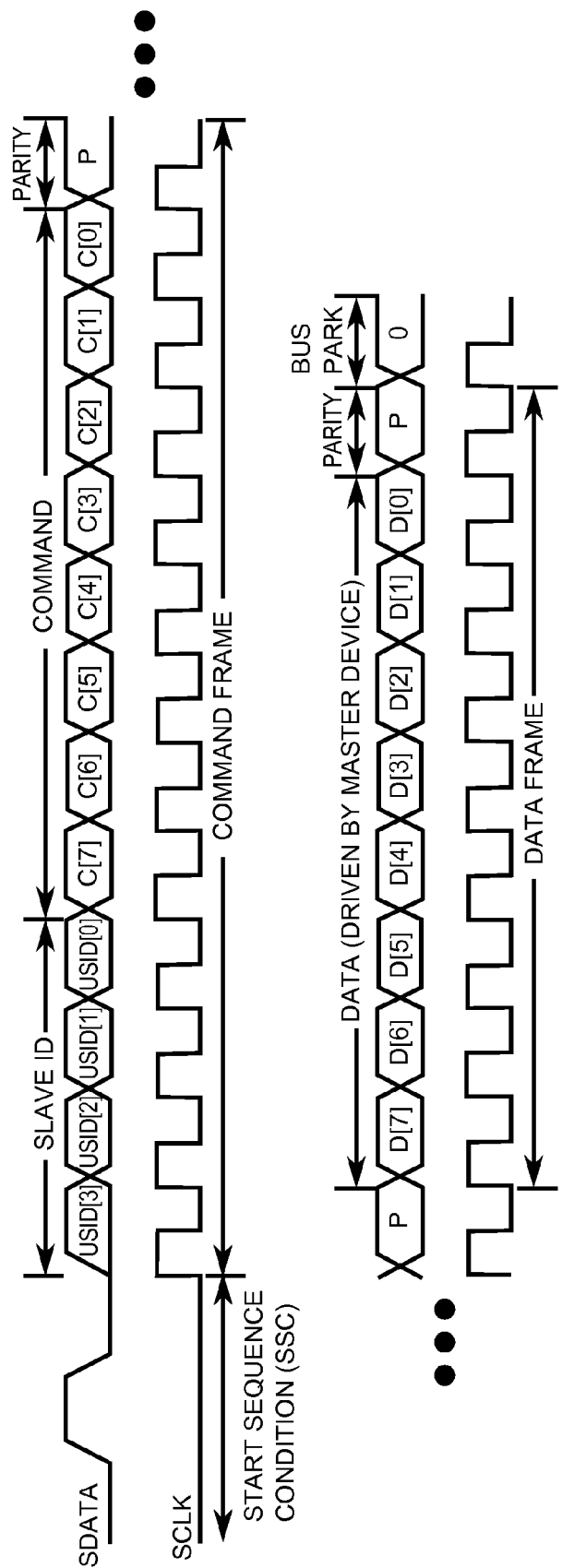
FIG. 5 is a representation of an exemplary RFFE command structure depicting a slave identification (Slave ID), a command, and data driven by a master device as employed in at least one embodiment of the present disclosure.

FIG. 5 is a representation of an exemplary RFFE command structure depicting a slave identification (Slave ID), a command, and data driven by a master device as employed in at least one embodiment of the present disclosure. Typically the serial communications protocol used on a serial communication bus such as the primary bus 36 (FIG. 3) and the buffered bus 38 (FIG. 3) will have a method of communicating to each slave device on the bus if the command sequence being sent is intended for that slave. For a MIPI (Mobile Industry Processor Interface) RFFE (Radio Frequency Front End) serial communications standard this information is contained within the unique slave identifier or USID. A general structure of a MIPI RFFE command is shown in FIG. 5.

Figure 6:
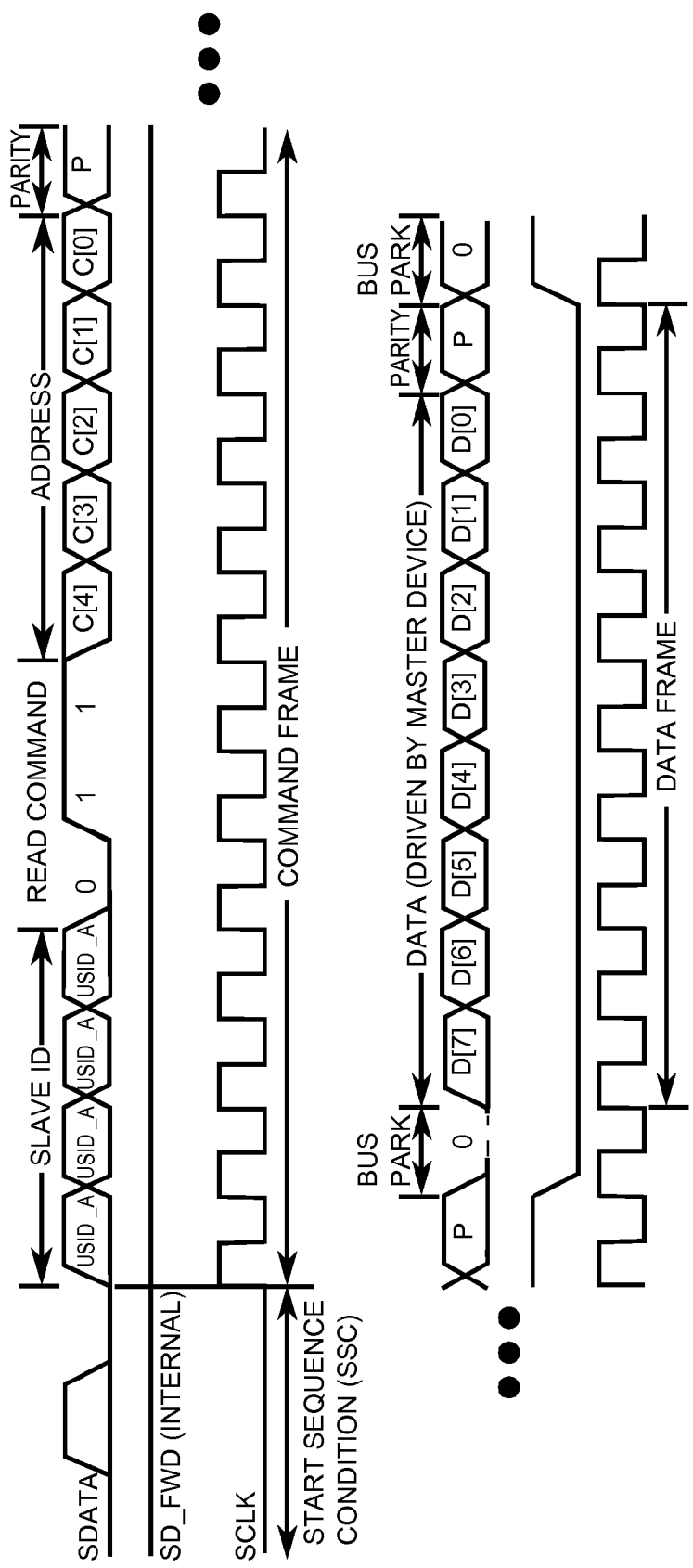
FIG. 6 is a representation of an exemplary RFFE buffered read-data structure depicting a slave identification (Slave ID), a read command, an address, and data driven by a slave device as employed in at least one embodiment of the present disclosure.

FIG. 6 is a representation of an exemplary RFFE buffered read-data structure depicting a slave ID, a read command, an address, and data driven by a slave device as employed in at least one embodiment of the present disclosure. As shown in FIG. 6, data may be read back from the sensitive slave device 40 (FIG. 3) connected to the buffered bus 38 (FIG. 3). In order to avoid bus contention on SDATA (i.e. two devices both trying to drive the same line) the serial bus buffer 48 is programmed in advance with all of the USIDs of every slave coupled to the buffered bus 38. If an RFFE read command is received by the serial bus buffer 48 and passed on to the slaves on the buffered bus 38, which is directed at one of the slaves on the buffered bus 38, then the serial bus buffer 48 will transfer serial data back to the primary bus 36 during the DATA FRAME of the RFFE command sequence using data sent from the slave on SDATA_B line 58 (FIG. 3). This is designated in FIG. 6 by an internal control line labeled SD_FWD going low during the DATA FRAME of the command sequence.

Figure 1:
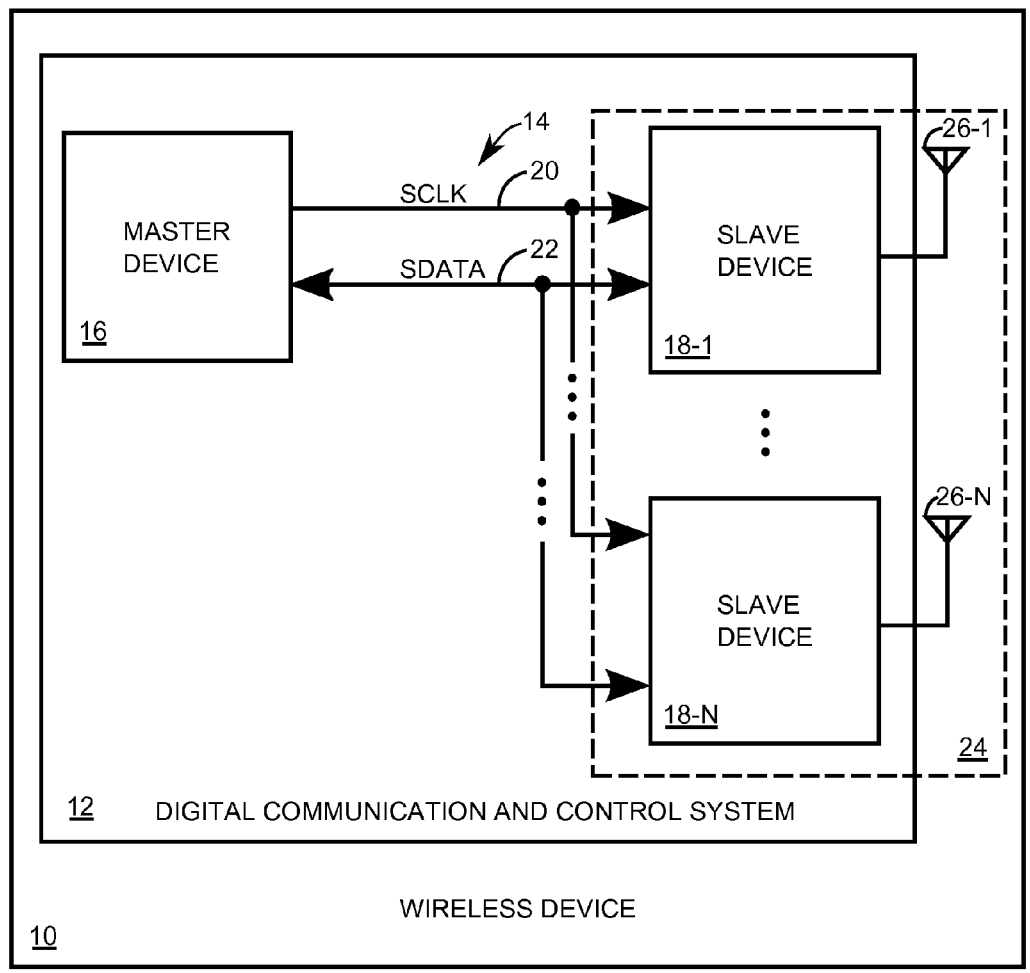
FIG. 1 is a block diagram of an exemplary related art digital communication and control system depicting a master device, bus structure, and slave devices that make up a radio frequency front-end (RFFE) of a wireless device.
Figure 2:
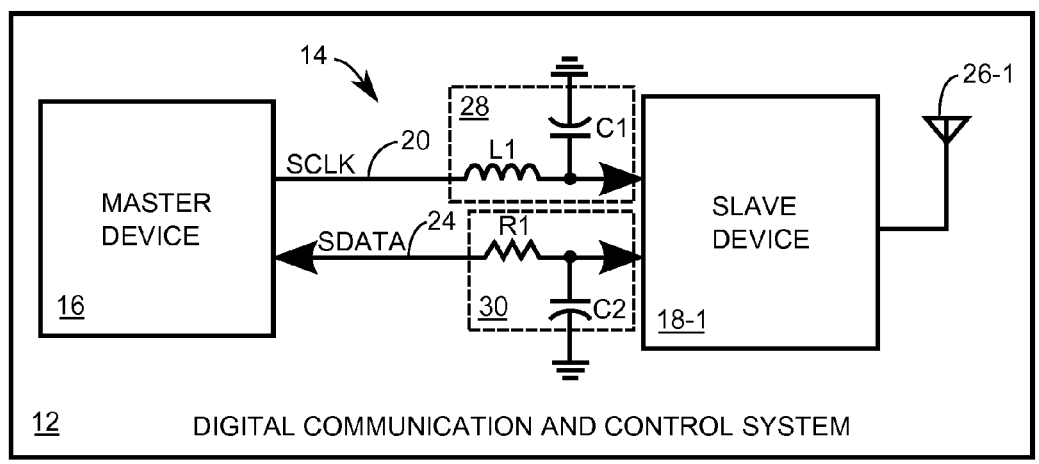
FIG. 2 is a block diagram of an exemplary related art digital communication and control system depicting a master device, bus structure, an LC filter, an RC filter, and slave devices.
Figure 7A:
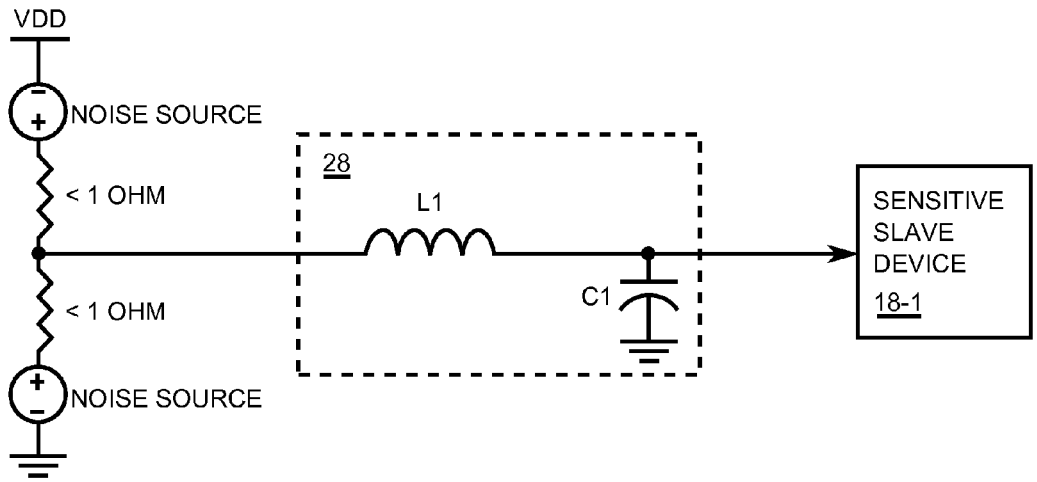
FIG. 7A depicts an equivalent model of the SCLK line of the related art digital communication and control system 12 of FIG. 2.

FIG. 7A depicts an equivalent model of SCLK line 20 of the related art digital communication and control system 12 of FIG. 2. In particular, the LC filter 28 is a low corner frequency low pass filter that has been added to reduce noise coupled from a digital region supply and/or ground to the sensitive device under control. In this example, assume that the impedance presented by a logic gate of master device 16 is 1 Ohm to either supply or ground, the series inductor L1 has an inductance value of 5.6 nH, and a capacitance value for the capacitor C1 used in the LC filter 28 is 50 pF. The attenuation of the noise can then be calculated as a simple voltage division at 2 GHz (for example) as follows:

$$Attn(\text{dB}) = 20 * \log 10 \left( \frac{X_c}{R + X_L + X_C} \right) \quad (1)$$

$$Attn(\text{dB}) = 20 * \log 10 \frac{\frac{1}{2*\pi*2e9*50e-12}}{1 + 2*\pi*2e9*5.6e-9 + \frac{1}{2*\pi*2e9*50e-12}} \quad (2)$$

$$Atten(\text{dB}) = 33.2 \text{ dB} \quad (3)$$

Figure 7B:
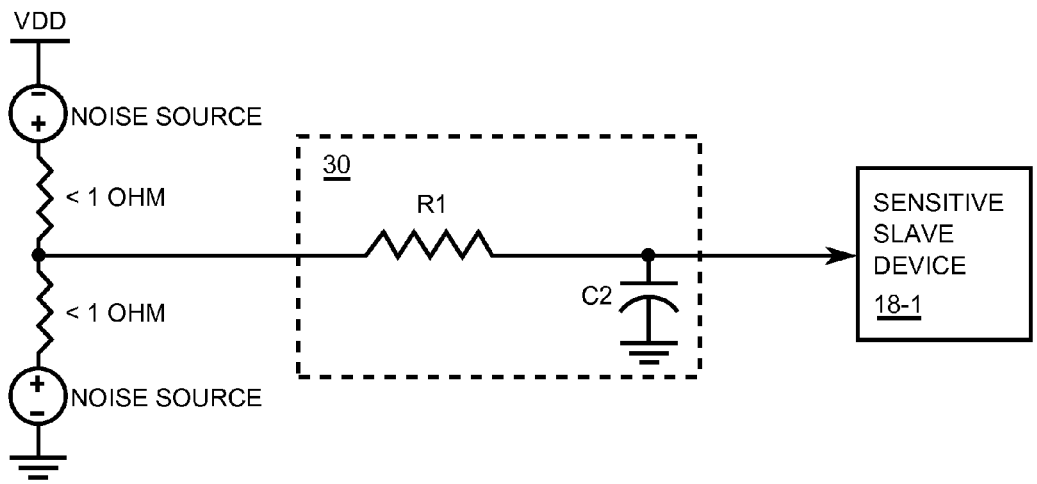
FIG. 7B depicts an equivalent model of the SDATA line of the related art digital communication and control system 12 of FIG. 2.

FIG. 7B depicts an equivalent model of SDATA line 22 of the related art digital communication and control system 12 of FIG. 2. In this case, the inductor is replaced with a 75 Ohm resistor R1 to yield a similar attenuation.

Figure 8:
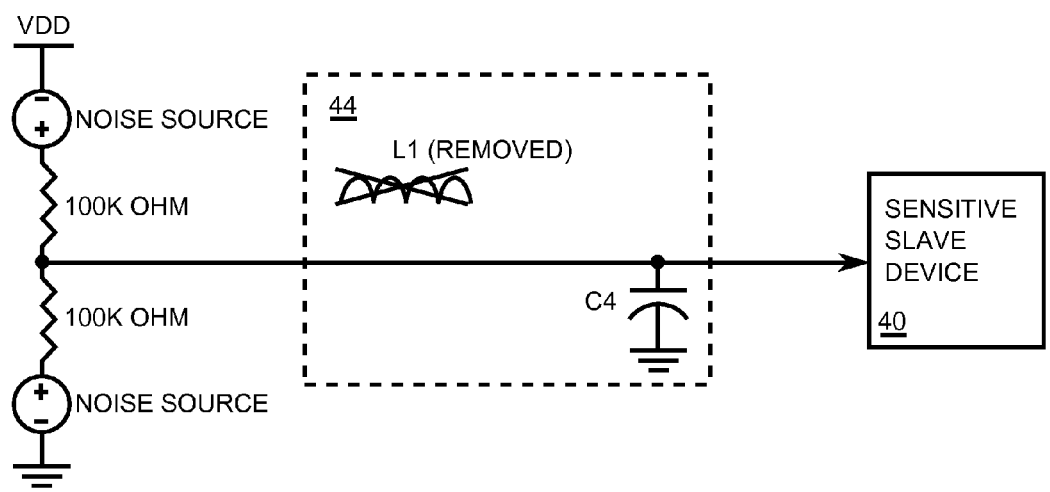
FIG. 8 depicts an equivalent model of the SCLK_B line wherein a digital gate of the serial bus of FIG. 3 is tri-stated in accordance with the present disclosure when communication is not required.

Now consider the circuit of FIG. 8 where a logic gate of the serial bus buffer 48 of FIG. 3 is tri-stated when communication is not required. In this example, assume that the impedance presented by the logic gate is 100K Ohm to either a supply VDD or to ground, the series inductor L1 is 0 nH (shorted/removed), and that the capacitance of the capacitor C4 used in the RC filter 46 is 5 pF. The attenuation of the noise can then be calculated as a simple voltage division at an exemplary frequency of 2 GHz as follows:

$$Attn(\text{dB}) = 20 * \log 10 \left( \frac{X_c}{R + X_L + X_C} \right) \quad (4)$$

$$Attn(\text{dB}) = 20 * \log 10 \frac{\frac{1}{2*\pi*2e9*5e-12}}{100000 + \frac{1}{2*\pi*2e9*5e-12}} \quad (5)$$

$$Atten(\text{dB}) = 124 \text{ dB} \quad (6)$$

Thus, in this example even though the filter capacitance was reduced by an order of magnitude and the series inductance was eliminated, the attenuation of noise at 2 GHz was improved by more than 100 dB. This shows that the use of a tri-state function on the buffered bus 38 used to drive slave devices in sensitive areas is significantly more effective than a traditional filtering of a bus with no tri-state function. Other advantages of using the tri-state buffer function of the present disclosure include savings in financial cost and circuit area by elimination of numerous inductors, capacitors and resistors, and an avoidance of drawing large current spikes to charge and discharge a large bus capacitance associated with traditional filtering.

FIG. 9 presents an exemplary wireless device 66 wherein an antenna tuner 68 and an antenna switch 70 are sensitive devices. Note that in this example both of these sensitive devices have LC filters on each SCLK and SDATA line to filter any potential noise coming from the digital section of the wireless device 66. The antenna switch 70 switches transmit signals TX_A and TX_B to the antenna tuner 68. In this example, the digital communication and control system 32 includes the serial bus buffer 48, but in general these lines could connect directly to a digital signal processing and control block (not shown) that is adapted to drive capacitive loads presented by filters made up of capacitors such as C3, C4, and C5. Receive signals RX_A and RX_B are also switched through the antenna switch 70.

Further still, a transceiver 72, power amplifier A 74, and power amplifier B 76 are considered to comprise non-sensitive devices and thus are connected directly to the primary bus 36. Equivalently, some or all of the non-sensitive devices could be added to outputs of the serial bus buffer 48 if desired. This is acceptable since any slave device does not drive the bus except during brief read back intervals and thus, any noise present on the supply or ground of these devices is not coupled to whichever bus is connected. A decision about which bus the non-sensitive devices are connected to is made based on convenience of location of these devices to the primary bus 36 and the buffered bus 38.

FIG. 10 presents the same situation as FIG. 9 except in this case the serial bus buffer 48 uses a tri-state function. As a result, the component values of resistance, inductance and capacitance needed for filtering clock and data signals for the antenna tuner 68 and the antenna switch 70 coupled to the serial bus buffer 48 is reduced by at least an order of magnitude compared to traditional filtering.

FIG. 11 is a schematic diagram of the serial bus buffer 48 that is adapted to provide selectable drive levels. For example, the serial bus buffer 48 is adapted to drive the buffered bus 38 with significantly higher capacitance than specified by the MIPI RFFE standard. Each device such as the antenna tuner 68 (FIG. 9) that is coupled to the buffered bus 38 typically includes a series inductance of 5.6 nH followed by a 33 pf capacitance to ground.

In an exemplary case there could be ten slave devices for a total of 330 pF of capacitance on the buffered bus 38 as compared to the MIPI specification of 25 pf total on a typical RFFE bus. In order to properly drive the buffered bus 38 with 330 pF of capacitance at 26 MHz, the drive levels for the SCLK_B line 54 and SDATA_B line 58 must be greater than is typically realized in baseband circuitry (not shown). Thus, the serial bus buffer 48 is configured to drive the buffered bus 38 with relatively large drive levels. The serial bus buffer 48 provides selectable drive levels via drive level enable bits EN_DB1 and EN_DB2 because an exact loading and number of devices connected to the buffered bus 38 may vary. First drive circuitry 78 provides a 1× drive level and second drive circuitry 80 provides a 2× drive level, while yet third drive circuitry 82 provides a 4× drive level. Further still, the serial bus buffer 48 also includes a selectable drive level for the SDATA_P line 56 on the primary bus 36 through the bits EN_D1 and EN_D2.

At least some of the devices driven by the buffered bus 38 may send data back through the buffered bus 38 to the primary bus 36. Thus, the serial bus buffer 48 includes registers 84 that can be programmed with the USID and group slave identifier (GSID) values of all devices connected to the buffered bus 38. If one of the USID values is decoded followed by an RFFE read command, then the serial bus buffer 48 will pull an internal control line SD_FWD low to allow data to pass backwards through the serial bus buffer 48 to the SDATA_P line 56. It is to be understood that the drive levels for the buffered bus 38 and the drive levels for the SDATA_P line 56 back to the primary bus 36 are not necessarily the same. Thus, a selection can be made for a first drive level from a first plurality of available drive levels for data driven on one bus, and another selection can be made for a second drive level from a second plurality of available drive levels for data driven on another bus.

The serial bus buffer 48 also provides two modes of operation to minimize noise generated on SCLK_B line 54 and SDATA_B line 58. A first mode involves disconnecting the SCLK_B line 54 and SDATA_B line 58 from potential noise sources. For example, the SCLK_B line 54 and SDATA_B line 58 can be disabled (tri-stated) if an enable buffer EN_BUFFER signal is held to a logic low. This tri-state condition is typically invoked to disconnect the SCLK_B line 54 and the SDATA_B line 58 from the serial bus buffer 48 once an initial programming of sensitive devices such as antenna switch 70 (FIG. 9) is completed. The tri-state condition is particularly useful when sensitive devices only need to be programmed at a startup and do not require reprogramming during an active part of the device operation. During the tri-state condition, the buffered bus 38 is practically decoupled from any noise present on the primary bus 36.

In a second mode, the SCLK_B line 54 and the SDATA_B line 58 can be tri-stated provided there is no activity on the primary bus 36 and if a buffer control bit referred to as TS_RFFE_CLKB is programmed high. In this case the buffered bus 38 automatically activates only when an RFFE command sequence is sent. If the RFFE command is not intended for the serial bus buffer 48 and not intended for one of the slaves on the buffered bus 38 as loaded into a serial bus buffer 48 register map, then the buffered bus 38 will be placed in the tri-state condition after the USID, broadcast slave identifier (BSID), or GSID is decoded. In such a case there will typically be at least 6 clock cycles on SCLK_B line 54 before the bus powers down.

Those skilled in the art will recognize improvements and modifications to the preferred embodiments of the present disclosure. All such improvements and modifications are considered within the scope of the concepts disclosed herein and the claims that follow.

What is claimed is:

1. A serial bus buffer comprising:
 a primary interface coupled to a primary serial data line and a primary serial clock line of a primary bus, wherein the primary bus is coupled to a first device and at least one second device;
 a buffered interface coupled to a buffered serial data line and a buffered serial clock line of a buffered bus, wherein the buffered bus is coupled to at least one third device; and
 a controller coupled between the primary interface and the buffered interface and configured to:
  receive a first data signal and a clock signal at the primary interface; and
  replicate the first data signal and the clock signal at the buffered interface upon receiving a first command within the first data signal to execute a first mode that passes the first data signal and the clock signal from the primary interface to the buffered interface.

2. The serial bus buffer of claim 1 wherein the first device is a master device and the at least one third device is a sensitive slave device.

3. The serial bus buffer of claim 2 wherein the at least one second device is a non-sensitive slave device.

4. The serial bus buffer of claim 1 wherein the buffered bus comprises at least one filter and wherein the at least one filter reduces spurious signals coupled to the buffered bus.

5. The serial bus buffer of claim 4 wherein the at least one filter is a low corner frequency low pass filter.

6. The serial bus buffer of claim 1 wherein the controller is further configured to provide a high impedance output at the buffered interface such that the first data signal and the clock signal are not replicated at the buffered interface.

7. A serial bus buffer comprising:
 a primary interface coupled to a primary serial data line and a primary serial clock line of a primary bus, wherein the primary bus is coupled to a first device and at least one second device;
 a buffered interface coupled to a buffered serial data line and a buffered serial clock line of a buffered bus, wherein the buffered bus is coupled to at least one third device; and
 a controller coupled between the primary interface and the buffered interface and configured to:
  receive a first data signal and a clock signal at the primary interface;
  select a first drive level from one of a first plurality of available drive levels; and
  replicate the first data signal and the clock signal at the first drive level at the buffered interface upon receiving a first command within the first data signal to execute a first mode that passes the first data signal and the clock signal from the primary interface to the buffered interface.

8. The serial bus buffer of claim 7 wherein the controller is further configured to:
 receive a second data signal at the buffered interface; and
 replicate the second data signal at the primary interface.

9. The serial bus buffer of claim 8 wherein the controller is further configured to:
 select a second drive level from a second plurality of available drive levels; and
 replicate the second data signal at the second drive level at the primary interface.

10. The serial bus buffer of claim 7 wherein the controller is further configured to:
 during a first mode, replicate the first data signal and the clock signal at the buffered interface; and
 during a second mode, the first data signal and the clock signal are not replicated at the buffered interface.

11. The serial bus buffer of claim 10 wherein during the second mode, the controller is further configured to provide a high impedance output at the buffered interface such that the first data signal and the clock signal are not replicated at the buffered interface.

12. A serial bus buffer comprising:
 a primary interface coupled to a primary serial data line and a primary serial clock line of a primary bus, wherein the primary bus is coupled to a first device and at least one second device;

a buffered interface coupled to a buffered serial data line and a buffered serial clock line of a buffered bus, wherein the buffered bus is coupled to at least one third device; and a controller coupled between the primary interface and the buffered interface and configured to:
receive a first data signal and a clock signal at the primary interface;
replicate the first data signal and the clock signal at the buffered interface upon receiving a first command within the first data signal to execute a first mode that passes the first data signal and the clock signal from the primary interface to the buffered interface;
receive a second data signal at the buffered interface; and
replicate the second data signal at the primary interface upon receiving a second command within the second data signal to execute a second mode that passes the second data signal and the clock signal from the buffer interface to the primary interface.

13. The serial bus buffer of claim 12 wherein the controller is further configured to:
select a first drive level from a first plurality of available drive levels; and
replicate the first data signal and the clock signal at the first drive level at the buffered interface.

14. The serial bus buffer of claim 13 wherein the controller is further configured to:
select a second drive level from a second plurality of available drive levels; and
replicate the second data signal at the second drive level at the primary interface.

15. The serial bus buffer of claim 12 wherein the controller is further configured to:
during a first mode:
replicate the first data signal and the clock signal at the buffered interface;
receive the second data signal at the buffered interface; and
replicate the second data signal at the primary interface; and
during a second mode:
the first data signal and the clock signal are not replicated at the buffered interface;
the second data signal is not received at the buffered interface; and
the second data signal is not replicated at the primary interface.

16. The serial bus buffer of claim 15 wherein during the second mode, the controller is further configured to provide a high impedance output at the buffered interface such that:
the first data signal and the clock signal are not replicated at the buffered interface;
the second data signal is not received at the buffered interface; and the second data signal is not replicated at the primary interface.

17. A serial bus buffer comprising:
a primary interface coupled to a primary serial data line and a primary serial clock line of a primary bus, wherein the primary bus is coupled to a first device and at least one second device;
a buffered interface coupled to a buffered serial data line and a buffered serial clock line of a buffered bus, wherein the buffered bus is coupled to at least one third device; and
a controller coupled between the primary interface and the buffered interface and to:
receive a first data signal and a clock signal at the primary interface;
during a first mode, replicate the first data signal and the clock signal at the buffered interface upon receiving a first command within the first data signal to execute the first mode that passes the first data signal and the clock signal from the primary interface to the buffered interface; and
during a second mode, the first data signal and the clock signal are not replicated at the buffered interface upon receiving a second command within the first data signal to execute the second mode that blocks the passing of the first data signal and the clock signal from the primary interface to the buffered interface.

18. The serial bus buffer of claim 17 wherein the controller is further configured to operate in the second mode until receiving the first data signal.

19. The serial bus buffer of claim 17 wherein the controller is further configured to operate in the second mode until a predetermined condition.

20. The serial bus buffer of claim 17 wherein the controller is further configured to operate in the second mode for a duration of the predetermined condition.

21. The serial bus buffer of claim 17 wherein during the first mode, the controller is further configured to:
receive a second data signal at the buffered interface; and
replicate the second data signal at the primary interface.

22. The serial bus buffer of claim 17 wherein during the first mode, the controller is further configured to:
select a first drive level from one of a first plurality of available drive levels; and
replicate the first data signal and the clock signal at the first drive level at the buffered interface.

23. The serial bus buffer of claim 22 wherein during the first mode, the controller is further configured to:
receive a second data signal at the buffered interface;
select a second drive level from one of a second plurality of available drive levels; and
replicate the second data signal at the second drive level at the primary interface.

* * * * *